(No Model.)
M. FLAMMANG.
Plate Holder for Cameras.
No. 238,669.      Patented March 8, 1881.
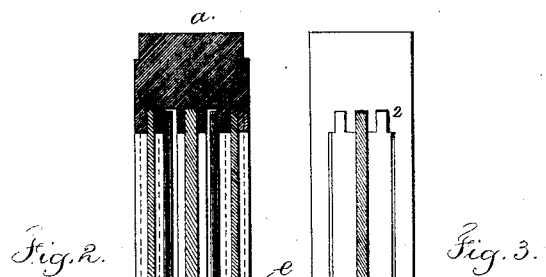
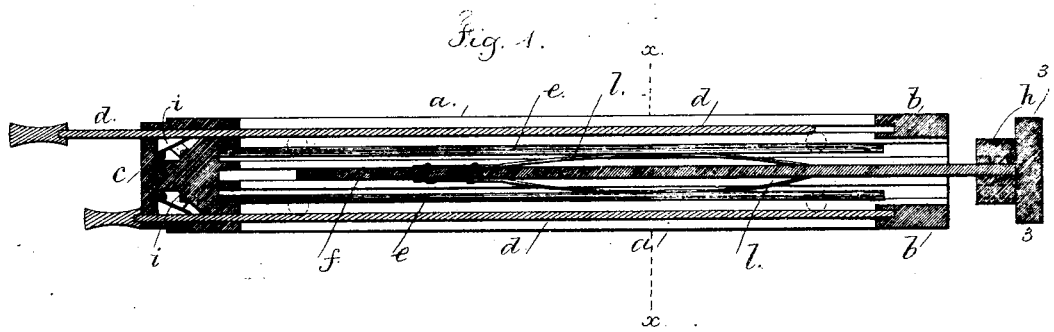
Witnesses
Chas. H. Smith
J. Hail
Inventor
Mathias Flammang
per Lemuel W. Serrell
att.

ably withdrawn.

UNITED STATES PATENT OFFICE.

MATHIAS FLAMMANG, OF NEWARK, NEW JERSEY, ASSIGNOR TO SCOVILL MANUFACTURING COMPANY, OF WATERBURY, CONNECTICUT.

PLATE-HOLDER FOR CAMERAS.

SPECIFICATION forming part of Letters Patent No. 238,669, dated March 8, 1881.

Application filed January 17, 1881. (No model.)

*To all whom it may concern:*

Be it known that I, MATHIAS FLAMMANG, of Newark, in the county of Essex and State of New Jersey, have invented an Improvement in Plate-Holders for Cameras, of which the following is a specification.

This invention is made for holding two dry plates in one holder and preventing the access to one plate while operating upon the other.

Plate-holders have been made to contain two dry plates, and a corrugated septum has been introduced between the same; but difficulty is experienced in so shutting off the rays of light that the sensitized plate is not injured.

I make use of a frame that is open at one end and adapted to receive the two glasses into separate grooves and a slide or septum in separate grooves between such glasses, and at the end is a peculiarly-constructed stopper that excludes light. Sliding covers are provided in the frame outside each glass, as heretofore used, and they can be withdrawn at the opposite end of the frame to the central septum, so that one does not interfere with the other, and the glasses are not liable to become misplaced or the surfaces injured.

In the drawings, Figure 1 is a sectional plan of the plate-holder with the septum and one of the slides partially withdrawn. Fig. 2 is a cross-section at the line *x x*, and Fig. 3 is a section of the septum and an interior view of the stopper.

The frame is composed of the side pieces, *a a*, and end pieces, *b b* and *c*. The side pieces, *a a*, have five grooves in the inner faces. The two outer grooves receive the slides *d d*, the next grooves receive the sensitized plates *e e*, usually of glass, and the middle groove receives the septum *f*. The end *c* is slotted for the slides *d d* to pass through, and the swinging cut-offs *i i* are provided, as usual, to prevent the light passing in when the slide *d* is withdrawn. The end pieces, *b b*, connect the side pieces together at one end of the frame; but they allow for the introduction freely of the glasses *e e* and the septum *f* from this end. There is a stopper, *h*, at the outer end of the septum, said stopper being of a size and shape to pass in between the end pieces, *b b*, of the frame, and the ends are notched at 2 2, so as to pass in between the ribs that are made in the inner faces of the side pieces, *a*, of the frame, and there is a flange or cap piece, at 3, to the stopper, which, when the septum and stopper are in place, lies close against the end of the frame. The light is effectually excluded by the stopper and flange of the septum, and the parts set together so closely that the friction prevents the septum sliding out of its place. There are also friction-springs *l l*, that press the glass plates outwardly to their proper places in the plate-holder, and these also serve to increase the friction that holds the septum and its stopper in position at the end of the plate-holder.

By my improvement two dry sensitized plates can be provided in one holder, and after the picture has been taken on one the holder can be reversed and another picture be taken on the second without risk of injury to the photographic negative.

I claim as my invention—

1. In a photographic plate-holding frame, the side pieces, *a*, with five grooves in each inner edge, in combination with the two separate slides *d* in the outer grooves, and a septum introduced into the central grooves, and a stopper at the end of the septum to close the opening in the frame, substantially as set forth.

2. The combination, with the central septum, *f*, in a double dry-plate holder, of a stopper at the end of the septum having grooves that fit the ribs upon the inside of the plate-holder frame, and a flange that closes against the end of the plate-holder frame, substantially as set forth.

Signed by me this 7th day of January, A. D. 1881.

M. FLAMMANG.

Witnesses:
 HAROLD SERRELL,
 GEO. T. PINCKNEY.